United States Patent

Oberpichler et al.

[11] 4,296,652
[45] Oct. 27, 1981

[54] HYDRAULIC CONTROL FOR AN AUTOMATIC VEHICLE TRANSMISSION

[75] Inventors: Gerd Oberpichler, Brunswick; Ernst-August Honig, Wolfsburg, both of Fed. Rep. of Germany

[73] Assignee: Volkswagenwerk Aktiengesellschaft, Wolfsburg, Fed. Rep. of Germany

[21] Appl. No.: 59,204

[22] Filed: Jul. 20, 1979

[30] Foreign Application Priority Data

Jul. 22, 1978 [DE] Fed. Rep. of Germany ....... 2832345

[51] Int. Cl.³ .............................................. B60K 41/06
[52] U.S. Cl. ......................................... 74/868; 74/867
[58] Field of Search .......................... 74/868, 869, 867

[56] References Cited

U.S. PATENT DOCUMENTS

| | | | |
|---|---|---|---|
| 3,237,476 | 3/1966 | Jandasek | 74/868 |
| 3,293,935 | 12/1966 | Tuck et al. | 74/868 |
| 3,546,973 | 12/1970 | Ohie et al. | 74/868 |
| 3,643,527 | 2/1972 | Ohnuma | 74/868 |
| 3,651,714 | 3/1972 | Ohya et al. | 74/867 |
| 3,863,739 | 2/1975 | Schaefer et al. | 74/869 |
| 3,886,820 | 6/1975 | Lentz | 74/868 X |
| 3,902,380 | 9/1975 | Murakami | 74/868 |
| 4,023,444 | 5/1977 | Murakami | 74/868 |
| 4,030,381 | 6/1977 | Lalin | 74/867 |

FOREIGN PATENT DOCUMENTS

| | | | |
|---|---|---|---|
| 1009496 | 5/1957 | Fed. Rep. of Germany | 74/868 |
| 2449382 | 7/1977 | Fed. Rep. of Germany | |
| 608674 | 5/1978 | U.S.S.R. | 74/867 |

Primary Examiner—Leslie Braun
Attorney, Agent, or Firm—Spencer & Kaye

[57] ABSTRACT

A hydraulic control device for an automatic vehicle transmission includes a main pressure control valve for delivering an engine load-dependent main output pressure for operating actuating components of the vehicle transmission and a pressure-limiting valve for delivering an engine load-dependent, upwardly limited control pressure. The pressure-limiting valve includes a control piston exposed to the control pressure and to the force of a spring opposing the control pressure. The device further has an additional control valve for applying to the main pressure control valve an output pressure which is a function of a vehicle speed-dependent pressure and the control pressure and which is modulated by the control pressure and a higher main input pressure.

5 Claims, 2 Drawing Figures

Fig.1

HYDRAULIC CONTROL FOR AN AUTOMATIC VEHICLE TRANSMISSION

BACKGROUND OF THE INVENTION

This invention relates to a hydraulic control device for an automatic vehicle transmission and is of the type which has a main pressure control valve for controlling an engine load-dependent main output pressure for actuating the switching components of the transmission. The hydraulic control device further has a pressure-limiting valve which delivers an upwardly limited control pressure dependent upon the engine load. The control piston of the pressure-limiting valve is exposed to the control pressure acting against the force of a spring.

A hydraulic control device of the above-outlined type is known and is disclosed, for example, in German Auslegeschrift (Accepted Published Patent Application) No. 2,449,382. In the hydraulic control device described therein, the pressure-limiting valve applies to the main pressure control valve a control pressure which, up to a predetermined load condition, is in essence proportionate to the engine load and which, dependent upon the vehicle speed, is upwardly limited by two different maximum pressure values. For this purpose, there is provided a switch-over valve which, dependent upon the vehicle speed, causes an additional work face of the control piston of the pressure-limiting valve to be exposed to pressure or, as the case may be, to be depressurized.

Although the above-outlined known control device sets a higher main pressure for the higher load ranges at vehicle speeds which are lower than, for example, 30 km/h, no changes in the main output pressure are obtained in response to partial loads. Since, however, upon starting a vehicle equipped with an automatic transmission, the torque is increased up to 2.5-fold of the engine torque because of the hydrodynamic torque converter, precisely in the partial load range, the main output pressure which actuates the switching components of the transmission should be increased for the purpose of preventing a slip-through of a switching component.

SUMMARY OF THE INVENTION

It is an object of the invention to provide an improved hydraulic control device of the above-outlined type, by means of which a still better adaptation of the main pressure to the gear load is achieved, particularly during vehicle start in the partial load range.

This object and others to become apparent as the specification progresses, are accomplished by the invention, according to which, briefly stated, the hydraulic control device comprises an additional control valve (modulated pressure control valve) which, as a function of a vehicle speed-dependent pressure and the control pressure obtained from the pressure-limiting valve, delivers a pressure which is modulated by the control pressure and the higher main pressure and which is applied to the main pressure control valve.

By providing that, according to the invention, the pressure modulated by the additional control valve with the control pressure and the higher main pressure is dependent from both the control pressure and the vehicle speed-dependent pressure, it is possible to increase the modulated pressure in a predetermined manner at vehicle speeds which are under a predetermined magnitude, for example, under 30 km/h. Such an increase of the modulated pressure applied to the main pressure control valve ensures a slip-free actuation of the switching components even under partial load conditions of the engine.

In accordance with a further feature of the invention, the modulated pressure of the additional control valve (modulated pressure control valve) is fed back to be applied to the control piston of the pressure-limiting valve. This arrangement has the advantage that the upward pressure limitation is effected also as a function of the modulated pressure, so that extremely high pressure values are avoided despite a steep course of the modulated pressure curve.

In accordance with further features of the invention, one work face of the control piston of the additional control valve is exposed to the control pressure of the pressure-limiting valve and another, oppositely oriented work face of the same work piston is exposed to the force of a spring and a vehicle speed-dependent pressure, and further, the modulated pressure is applied to a further work face of the piston. Two control edges of the piston of the additional control valve control the flow of hydraulic fluid from a port in which the control pressure prevails and from a port in which the higher main pressure prevails, for forming the modulated pressure. Further, a first work face of the control piston of the pressure-limiting valve is exposed to the control pressure and a second work face of the piston is exposed to the modulated pressure of the additional control valve to act against a spring force exerted to an end face of that piston.

DESCRIPTION OF THE PREFERRED EMBODIMENT

Figure 1:
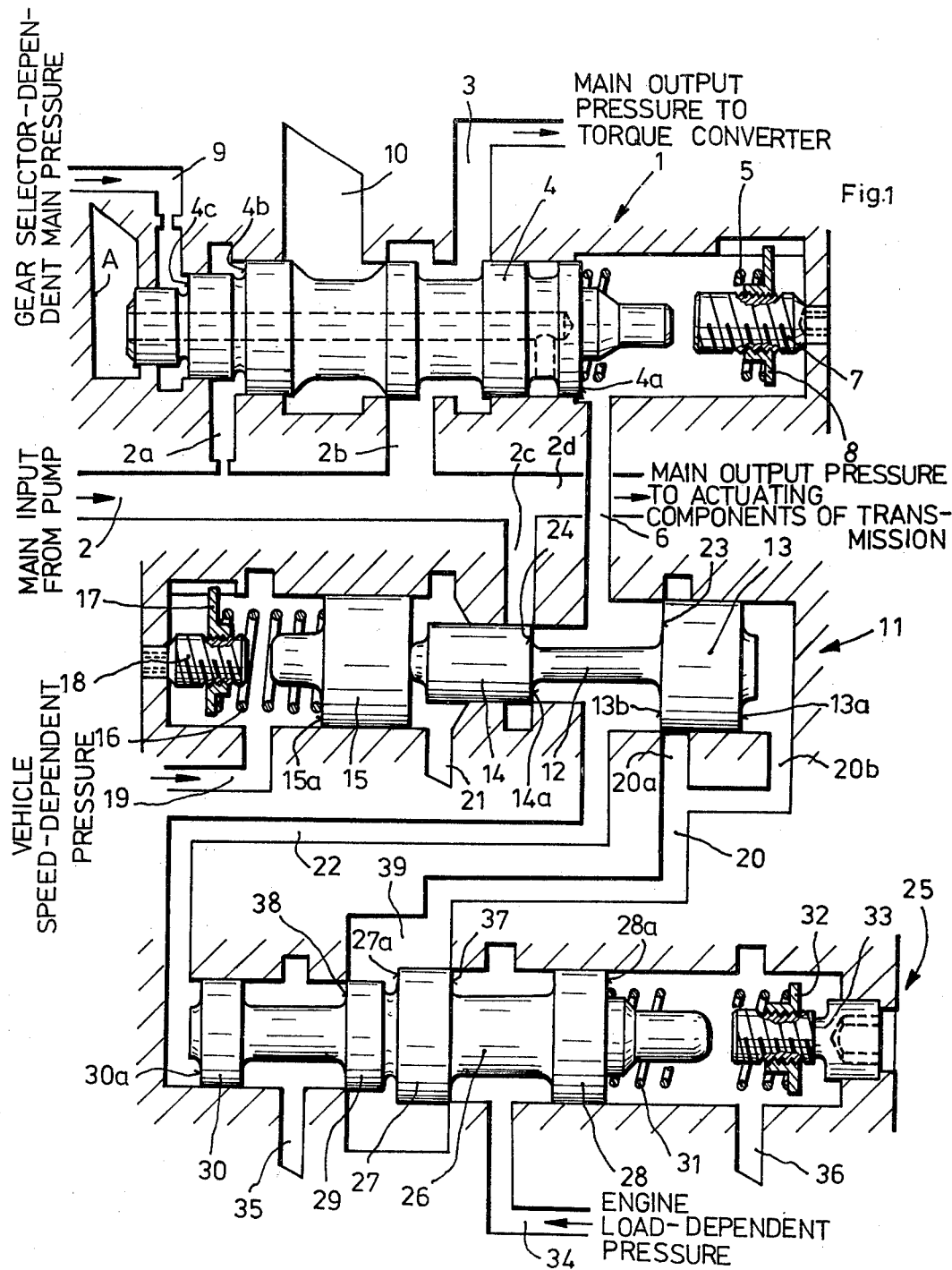
FIG. 1 is a schematic view of a preferred embodiment of the invention.

Turning now to FIG. 1, the hydraulic control device shown therein comprises a main pressure control valve generally indicated at 1 which, in a manner to be described, regulates the main output pressure of the hydraulic fluid delivered by the device through a main pressure conduit 2 and a main output pressure conduit 3. The hydraulic fluid under pressure is delivered to the hydraulic control device from a gear pump (not shown) through the main pressure conduit 2. The hydraulic fluid, having the main output pressure, is delivered in a branch conduit 2d of the main pressure conduit 2 to switch components (not shown) such as clutches and brakes as well as to the control elements (also not shown) of an automatic vehicle transmission and is further delivered in the main pressure output conduit 3 to the torque converter of the automatic vehicle transmission.

The main pressure control valve 1 comprises a piston 4 having a terminal work face 4a which is exposed to the force of a compression spring 5 adjustable by shifting its spring seat disc 8 by means of a setscrew 7. The work face 4a is further exposed to the pressure of hydraulic fluid admitted through a modulated pressure conduit 6. The main pressure admitted to the piston 4 through the branch conduit 2a of the main pressure conduit 2 opposes the forces on work face 4a, together with the main pressure which is applied to the piston 4 through a conduit 9 and which is dependent upon the transmission gear setting N, D, 2 and 1 of a manual gear selector (not shown). The hydraulic pressures admitted to the piston 4 through the conduits 2a and 9 are applied to respective annular work faces 4b and 4c of the piston 4.

When the engine is at a standstill, the piston 4 is pressed by the spring 5 against an abutment A, whereby the main output pressure conduit 3 as well as a discharge conduit 10 communicating with a sump are blocked by the piston 4. As the pump starts delivering hydraulic fluid under pressure as the engine begins its run, a main input pressure is applied through the branch conduit 2a to the piston face 4b. Also, a pressure dependent upon the position of the manual gear selector is applied to the piston face 4c from the conduit 9.

When the pressure applied to the piston faces 4b and 4c (that is, the pressure which urges the piston 4 towards the right) reaches a magnitude which begins to overcome the force of the spring 5 and the modulated pressure applied to the piston face 4a, the piston 4 is shifted towards the right. As a result, the piston 4 allows the hydraulic fluid to pass in a controlled manner through the output pressure conduit 3. As the pressurized oil supply increases, the piston 4 is displaced further towards the right until the piston 4 opens the discharge conduit 10 and thus the excess fluid can return through the discharge conduit 10 to the sump. It is thus seen that by changing the control pressure applied to the piston face 4a through the modulated pressure conduit 6, the main input pressure in the conduit 2 and the main output pressure in the conduit 3 can be altered, that is, it can be caused to assume a course as determined by the modulated pressure in the modulated pressure conduit 6.

The modulated pressure is generated in an additional pressure control valve (or modulated pressure control valve) generally indicated at 11, whose control piston is, for manufacturing reasons, comprised by a dual piston 12 having a relatively large-diameter first land 13 and a relatively small-diameter second land 14 as well as a single piston 15 having a relatively large diameter comparable to that of the land 13. The control pistons 12 and 15 are biased towards the right by a spring 16 which exerts a force on a terminal work face 15a of the piston 15. The spring 16 can be adjusted by shifting its spring seat disc 17 by an associated setscrew 18. The work face 15a of the piston 15 is further exposed to a regulator pressure which is proportionate to the vehicle speed and which is admitted to the piston 15 through a conduit 19. The terminal work face 13a of the first piston land 13 is exposed to a control pressure which is admitted through a conduit branch 20b of a control pressure conduit 20. This control pressure increases in proportion to the engine load up to a settable limit value. The generation of the modulated pressure is achieved by control edges 23 and 24 of the dual piston 12. These control edges control the admission of the hydraulic fluid from the conduit branch 20a of the control pressure conduit 20 and the conduit branch 2c of the main pressure conduit 2. The conduit 21 is a port communicating with the oil sump (or the pump intake conduit).

The control pressure applied by the control pressure conduit 20 to the additional control valve 11 is generated in a pressure-limiting valve generally indicated at 25, whose control piston 26 has a piston land 28, terminating in a work face 28a. The latter is exposed to the force of a compression spring 31 which is adjustable by shifting its spring seat disc 32 by means of a setscrew 33. Hydraulic fluid, whose pressure increases in proportion to the engine load, is admitted to the control piston 26 through a conduit 34. Dependent upon the position of the control edges 37 and 38 of the respective piston lands 27 and 29, from the pressure delivered through the conduit 34 there is formed the upwardly limited control pressure in a pressure chamber 39. This is so, since the control edge 37 regulates the admission of the hydraulic fluid from the conduit 34 to the pressure chamber 39, while the control edge 38, in turn, regulates the discharge of hydraulic fluid from the pressure chamber 39 to a conduit 35 communicating with the sump. The control pressure thus generated in the pressure chamber 39 (which communicates with the control pressure conduit 20) exerts a force on the work face 27a of the land 27; the size of the annular work face 27a is given by the difference of the radial faces of the piston land 27 and the piston land 29. The modulated pressure generated in the additional control valve 11 is applied by a feedback conduit 22 to the work face 30a of a piston land 30 of the control piston 26. The modulated pressure thus exerts a force on the piston 26 in the same direction as the pressure prevailing in the pressure chamber 39. The work face 30a is identical to the entire terminal face of the land 30. The conduit 36 is a discharge port communicating with the oil sump.

In the description which follows, the operation of the above-described hydraulic control device will be set forth in more detail.

The pressure-limiting valve 25 first admits the load-proportionate pressure from the conduit 34 into the pressure chamber 39, whereupon the pressurized hydraulic fluid enters into the control conduit 20 until the control edge 37 of the control piston 26 closes the passage to the pressure chamber 39 as the control piston 26 is displaced towards the right. During this displacement, the control edge 38 of the piston land 29 may establish communication between the discharge conduit 35 and the pressure chamber 39. This state of the control piston 26 is determined in essence by the force of the spring 31 which opposes the control pressure applied to the annular work face 27a of the land 27 and the modulated pressure delivered by the feedback circuit 22 and applied to the work face 30a of the piston land 30. Thus, the load-proportionate increase of the control pressure is discontinued at a certain moment which depends upon the magnitude of the modulated pressure delivered by the feedback conduit 22. Stated differently, the control pressure is limited upwardly.

The load-proportionate and upwardly limited control pressure is applied by the conduit branch 20b to the work face 13a of the piston land 13. This pressure is opposed by the force of the spring 16 and the vehicle speed-proportionate pressure, both affecting the work face 15a of the piston 15. The force of the spring 16 and the force derived from the vehicle speed-proportionate pressure applied to the work face 15a is assisted by the modulated pressure which is generated in the additional pressure control valve 11 and which is applied to the work faces 13b of the land 13 and the work face 14a of the land 14; the resulting force derived from the modulated pressure is determined by the difference between the areas 13b and 14a.

The spring 16 of the additional pressure control valve 11 is so set that at a vehicle speed of at least 30 km/h, that is, in the higher vehicle speed range, the control pistons 12 and 15 of the additional control valve 11 are, independently from the magnitude of the control pressure applied to the work face 13a, shifted to such an extent towards the right that the control edge 23 of the piston land 13 opens the conduit branch 20a of the control pressure conduit 20 and the control edge 24 of the piston land 14 closes the conduit branch 2c of the main input pressure conduit 2. In this manner the control pressure which is generated in the pressure-limiting valve 25 and which increases up to a limit value as a function of the load, is also communicated without change to the main pressure control valve 1 by the conduit 6 and, respectively, to the pressure-limiting valve 25 by the feedback conduit 22.

Figure 2:
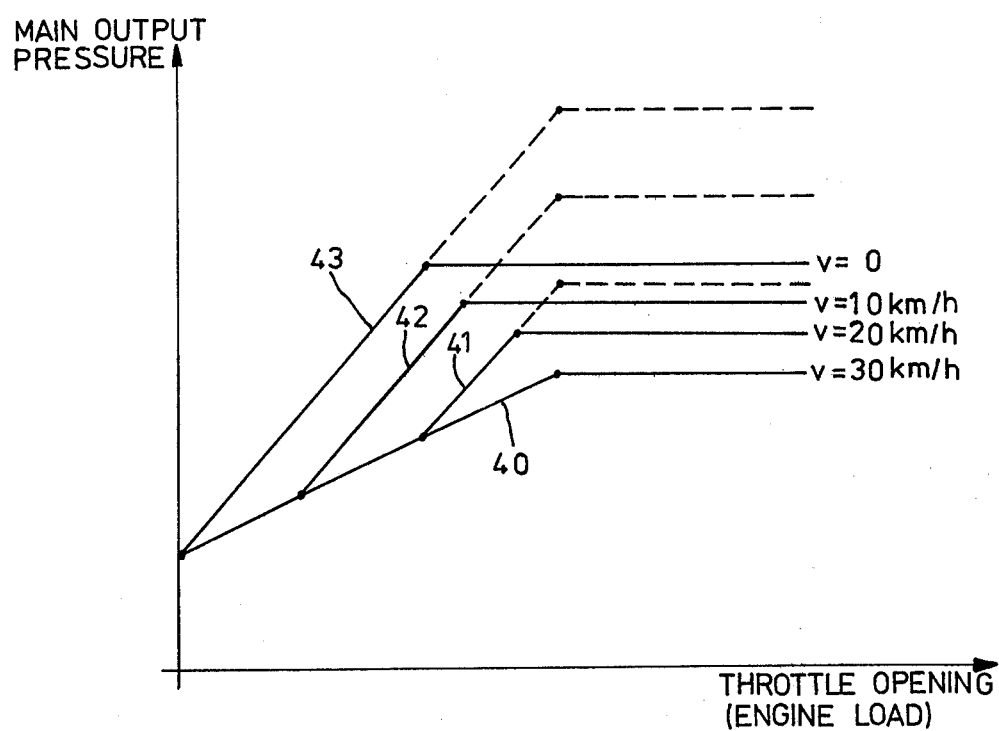
FIG. 2 is a diagrammatic view illustrating the main output pressure delivered by the hydraulic control device according to the invention, as a function of the throttle opening (i.e. load) of the engine.

At vehicle speeds below approximately 30 km/h, that is, in the starting speed range of the vehicle, the control pistons 12, 15 of the additional control valve 11 are, as a function of the magnitude of the vehicle speed-proportionate pressure (applied by the conduit 19) and the opposing load-dependent control pressure (applied by the conduit branch 20b) shifted at a certain moment to such an extent towards the left that the control edge 24 of the piston land 14, for admixing the higher main pressure, opens the branch 2c of the main pressure conduit 2, while the control edge 23 of the piston land 13 closes the control pressure conduit branch 20a. Turning now to FIG. 2, in this manner there is obtained, as a function of the throttle opening, that is, as a function of the load, the pressure course of the modulated pressure and, consequently, the course of the main output pressure determined by the modulated pressure and increased in the main pressure control valve. The curve 40 indicates the course of the pressure as a function of the load at vehicle speeds of 30 km/h and above; this, in essence, is identical to the control pressure of the pressure-limiting valve 25. The curves 41, 42 and 43 designate the pressure course at speeds of 20, 10 and 0 km/h, respectively. While in case of pressures characterized by the curves 41 and 42, the pressure, at small throttle openings, first remains identical to the control pressure indicated by the curve 40, there is obtained at zero speed the steeper course of the modulated pressure even at the smallest loads. The reason for this is seen in the circumstances that upon starting the vehicle from a state of rest, the pistons 12, 15 of the additional control valve 11 are already in their mid-position shown in the drawing, into which they have been set by the so-called zero gas pressure delivered by the control pressure conduit 20. Any further load increase then causes an increasing shift of the control pistons 12 and 15 towards the left, thus resulting in an increasing admixture of the higher main pressure from the conduit branch 2c, until, by virtue of the increased modulated pressure affecting the work face 13b of the piston land 13, there is again obtained an equilibrium of the forces imparted on the work faces of the pistons 12 and 15.

The broken-line portions of the curves illustrated in FIG. 2 indicate the course of the main output pressure in case the feedback conduit 22 extending from the output of the additional control valve 11 to the work face 30a of the control piston 26 is omitted. In such a case then the work face 30a too, would be exposed to the control pressure from the control pressure conduit 20 (by means of an appropriately arranged branch conduit of the conduit 20) in which case there would be obtained an upward limitation of the modulated pressure or, respectively, the main output pressure at a constant engine load as determined by the spring 31. This, however, could lead to impermissibly high pressure values. The occurrence of such an undesirable circumstance is prevented by feeding back the modulated pressure by the feedback conduit 22 and applying it to the work face 30a. The pressure limitation is then obtained already at small engine loads by virtue of the modulated pressure which is greater than the control pressure.

It is to be added that both in the additional control valve (modulated pressure control valve) 11 and in the pressure-limiting valve 25, there is effected a pressure control by admixing a higher pressure with a lower pressure (which in some instances may be the ambient atmospheric pressure). A difference in the manner of admixing the pressures resides in that in the case of the additional control valve 11 the control edges 23 and 24 are provided at work faces which are oriented towards one another and which belong to the different piston lands 13 and 14, whereas in the case of the pressure-limiting valve 25, the control edges 37 and 38 are provided at oppositely oriented work faces of the piston lands 27 and 29. The associated control edges provided in the valve housing are, in the first case, separated from one another and associated with two different pressure inlets, whereas in the second case, in a technologically more favorable realization, the lateral boundaries form a common housing pocket enclosing the pressure chamber 39. It is to be understood that these different embodiments of the pressure mixing devices may be selectively utilized in each instance at the other valve.

Contrary to known hydraulic control devices, the invention thus achieves a significantly improved adaptation of the main pressure (delivered in the conduit 2 and 3) to the load condition of the engine and particularly to the conditions determined by a partial load during the starting phase of the vehicle. The hydraulic pressure available for the switching components of the automatic transmission is of variable magnitude which depends upon the load conditions and the vehicle speed and which is an inverse function of the starting speed of the vehicle. It is a further advantage of the invention that the transition from one pressure characteristic curve to another (that is, as the vehicle speed changes) upon exceeding or, respectively, falling below predetermined speeds, does not occur in steps; rather, the pressure is changed slowly and steplessly as a function of the vehicle speed. At the same time, it is ensured that the pressure at zero load, that is, when the throttle valve is closed, is not higher than the normal pressure so that the smoothness of switching is not adversely affected during gear changing below, for example, 30 km/h.

It is to be understood that the above description of the present invention is susceptible to various modifications, changes and adaptations and the same are intended to be comprehended within the meaning and range of equivalents of the appended claims.

What is claimed is:

1. In a hydraulic control device for an automatic vehicle transmission including a main pressure control valve for delivering an engine load-dependent main output pressure for operating actuating components of the vehicle transmission; and a pressure-limiting valve for delivering an engine load-dependent, upwardly limited control pressure; said pressure-limiting valve including a control piston exposed to said control pressure and to the force of a spring opposing the control pressure; the improvement comprising an additional control valve means for applying to said main pressure control valve an output pressure being a function of a vehicle speed-dependent pressure and said control pressure and being modulated by said control pressure and a higher main input pressure.

2. A hydraulic control device as defined in claim 1, further comprising feedback means for applying the output pressure of said additional control valve means to the control piston of said pressure-limiting valve.

3. A hydraulic control device as defined in claim 1, wherein said control piston is a first control piston and further wherein said additional control valve means includes
 (a) a first inlet for introducing said control pressure from said pressure-limiting valve to said additional control valve means;
 (b) a second inlet for introducing said control pressure from said pressure-limiting valve to said additional control valve means at a location spaced from said first inlet;
 (c) a third inlet for introducing said vehicle speed-dependent pressure to said additional control valve means;
 (d) a fourth inlet for introducing a main input pressure to said additional control valve means;
 (e) a slidably arranged second control piston having
  (1) a first terminal work face arranged at one end of said second control piston to be exposed to said control pressure from said first inlet for urging said second control piston in a first direction;
  (2) a second terminal work face arranged at another, opposite end of said second control piston to be exposed to said vehicle speed-dependent pressure from said third inlet for urging said second control piston in a second direction opposite said first direction;
  (3) an additional work face arranged between said first and second terminal work faces to be exposed to said control pressure from said second inlet and to said main input pressure from said fourth inlet for urging said second control piston in said second direction;
  (4) first and second control edges controlling, respectively, said second and fourth inlets for regulating an admixture of said control pressure with said main input pressure for forming the modulated output pressure; and
 (f) a spring engaging said second terminal work face for urging said second control piston in said second direction.

4. A hydraulic control device as defined in claim 3, further comprising feedback means for applying the output pressure of said additional control valve means to said first control piston forming part of said pressure-limiting valve.

5. A hydraulic control device as defined in claim 4, wherein said first control piston of said pressure-limiting valve has a first work face arranged to be exposed to the control pressure formed in said pressure-limiting valve and further wherein said first control piston has a second work face arranged to be exposed to the output pressure formed in said additional control valve means and delivered in said feedback means; and further wherein said spring of said pressure-limiting valve engages an end of said first control piston for urging it against the pressures exerted on the first and second work faces of said first control piston of said pressure-limiting valve.

* * * * *